Figure 1:
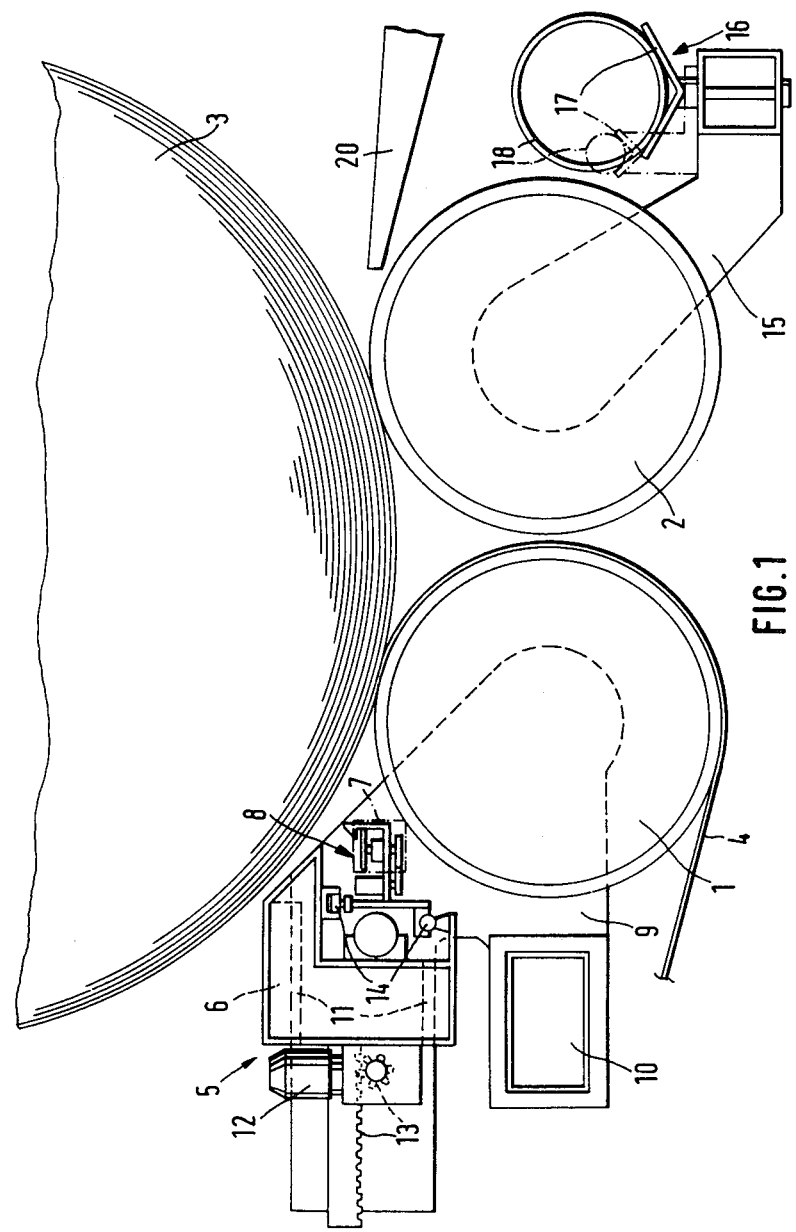

United States Patent [19]

Dropczynski

[11] Patent Number: 4,485,979

[45] Date of Patent: Dec. 4, 1984

[54] DEVICE FOR SHAFTLESS WINDING MACHINES

[75] Inventor: Hartmut Dropczynski, Düsseldorf, Fed. Rep. of Germany

[73] Assignee: Jagenberg AG, Dusseldorf, Fed. Rep. of Germany

[21] Appl. No.: 422,990

[22] Filed: Sep. 24, 1982

[30] Foreign Application Priority Data

Dec. 24, 1981 [DE] Fed. Rep. of Germany ....... 3151256

[51] Int. Cl.³ ...................... B65H 19/20; B65H 17/08
[52] U.S. Cl. .................................... 242/56 R; 242/66
[58] Field of Search ............... 242/56 A, 64, 66, 56 R

[56] References Cited

U.S. PATENT DOCUMENTS

| T946,008 | 5/1976 | Benson et al. ............... 242/56 R |
| 3,918,654 | 11/1975 | Okubo et al. ............... 242/56 R |
| 4,133,495 | 1/1979 | Dowd ............................ 242/66 |
| 4,344,605 | 8/1982 | Gansever et al. ............ 242/56 R X |
| 4,370,193 | 1/1983 | Knauthe ........................ 242/66 X |

FOREIGN PATENT DOCUMENTS 697285 11/1964 Canada .................................. 242/66
2709684 9/1977 Fed. Rep. of Germany ........ 242/66

Primary Examiner—Stuart S. Levy
Assistant Examiner—Leo J. Peters
Attorney, Agent, or Firm—Sprung Horn Kramer & Woods

[57] ABSTRACT

In a shaftless machine for winding a web (4) on a roll (3), the machine having a pair of carrier rollers (1,2) of which at least one is driven, means (16) for introducing a roll into the gap between said carrier rollers, an assembly (5) comprising an ejection beam (6) and cutting (8) and fastening means (7), and means (9–14) for pivoting the assembly about the axis of one of the carrier rollers so as to eject a wound roll and, after a new roll (18) is introduced, to cut the web and to fasten it to the new roll, the improvement which comprises means (11–13) for displacing the assembly transverse to the axes of the carrier rollers thereby to adjust the position of the ejecting, cutting and fastening means so as to accommodate rolls of different diameters.

3 Claims, 5 Drawing Figures

DEVICE FOR SHAFTLESS WINDING MACHINES

The invention is a device that is intended for shaftless winding machines involving a pair of rotating carrier rollers and consists of a fastening and cutting device combined by an ejection beam into an assembly that pivots at an angle to the axes of one of the carrier rollers.

Such a device is known from German OS 2 709 684. When the reels are changed with the known device, the full reel is lifted slightly off of one carrier roller and a core positioned on the carrier rollers through the resulting gap. The reel is then restored to its original position in the carrier-roller bed and subsequently ejected over the other carrier roller by the ejection roller after the assembly has pivoted. The fastening device inside the assembly that has been pivoted into the carrier-roller bed then fastens the web to the core and, finally, the cutting device cuts the web in two.

The known device can be employed only with cores that are small enough to fit into the wedge between the two carrier rollers before the reel has been ejected and to pass through the gap between the raised reel and the carrier roller. The assembly consisting of the ejection beam and the fastening and cutting device can only be used with reels of a particular diameter. Its elements are rigidly positioned and its pivoting stroke preset. Since the wedge and gap are relatively small, machines of this type can only be used for winding paper, and the device known from OS 2 709 684 is not appropriate for winding cardboard, which has to go onto larger cores.

The objective of the invention is a device that can accept cores of varying diameter in automatic reel changing.

The invention is a device of the type initially described and attains this objective because the extent of pivoting of the assembly about the axes of the carrier rollers is adjustable.

A moving assembly makes it possible to adjust to cores of various sizes before or after the unit has been pivoted into position above the carrier-roller bed. It is also possible to adjust the motion of the unit to a desired core diameter before or after the unit has been pivoted.

In one preferred embodiment of the invention a motor and a rack and pinion drive the assembly along rails on the pivoting levers, a relatively simple design.

It is also preferable to mount the assembly that consists in accordance with the invention of the ejection beam and fastening and cutting device so that it can be pivoted into an operating position (the fastening and cutting position) in the midplane of the winding machine above the carrier rollers and there moved up and down. This will ensure that the fastening and cutting device will always engage the core at its uppermost vertical line even though the assembly moves in relation to the core. This is important when the end of the web is to be fastened precisely to a strip of glue or gummed tape on the vertical line on a reel of any diameter.

It is also preferable to mount the fastening and cutting device on the ejection beam in the invention in such a way that it can travel horizontally along the rails. This allows continuous cutting of the web and subsequent fastening of the resulting new web end to the circumference of the reel.

The invention will now be specified with reference to the drawings, in which

FIGS. 1 through 5 illustrate the winding machine at various stages of changing a reel. Identical parts are identified in the different figures with the same reference numbers.

At the stage shown in FIG. 1, a reel 3 rests on rotating carrier rollers 1 and 2, at least one of which is powered, and is wound with a web 4 as it rotates. An assembly 5, which consists of an ejection beam 6, a fastening device 7 (represented in broken lines because it lies behind the cutting device in the longitudinal direction), and a cutting device 8, is mounted on two levers 9 that are rigidly attached to each other and pivot around the axis of the carrier roller 1 that the web is wrapped over. A motor 12 and a rack and pinion 13 drive assembly 5 along rails 11 on pivoting levers 9 across the axis of carrier roller 1. Fastening and cutting device 7, 8 travels horizontally, parallel to the axes of carrier rollers 1 and 2 along guides 14 on ejection beam 6.

When the winding machine is in operation, assembly 5 is pivoted on pivoting levers 9 into the rest position shown in FIG. 1.

A core inserter 16 is mounted on arms 15 that pivot around the axis of the carrier roller 2 around which the web is not wrapped. At the stage shown in FIG. 1, core inserter 16 is in a ready position with a core 18 resting on its bed 17. Another core 18 with a shorter diameter and resting on a correspondingly smaller bed 17 is also drawn with dot-and-dashed lines.

FIGS. 2 through 5 illustrate changing the reels.

Figure 2:
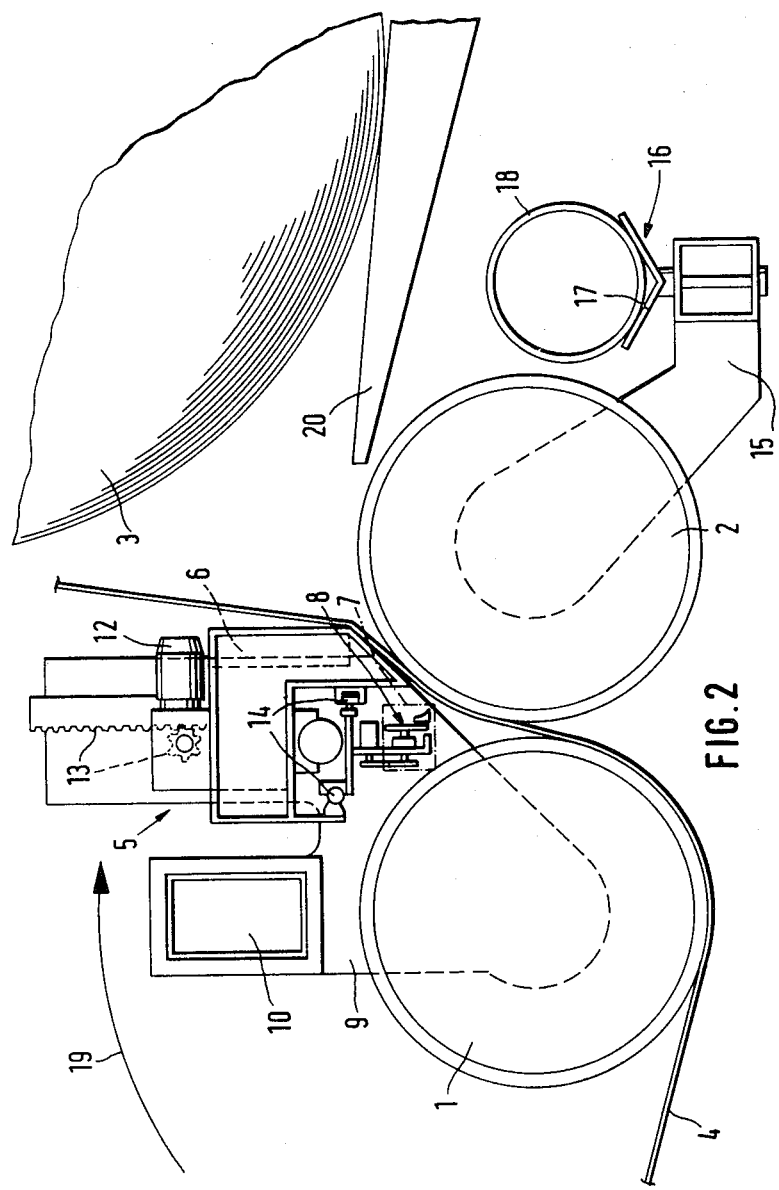

In FIG. 2 lever 9 has pivoted up in the direction indicated by arrow 19, ejecting the full reel 3 from the carrier-roller bed onto a drop platform 20. Web 4 is pulled along behind. Upon arriving at its forward position as illustrated in FIG. 2, ejection beam 6 can be preadjusted to any core diameter by displacing assembly 5 along rails 11. Levers 9 then pivot back in the direction indicated by arrow 22 to retract unit 5 from the carrier-roller bed. Web 4 is now slackened by releasing a brake for example or by lowering drop platform 20 slightly with reel 3 resting on it.

Figure 3:
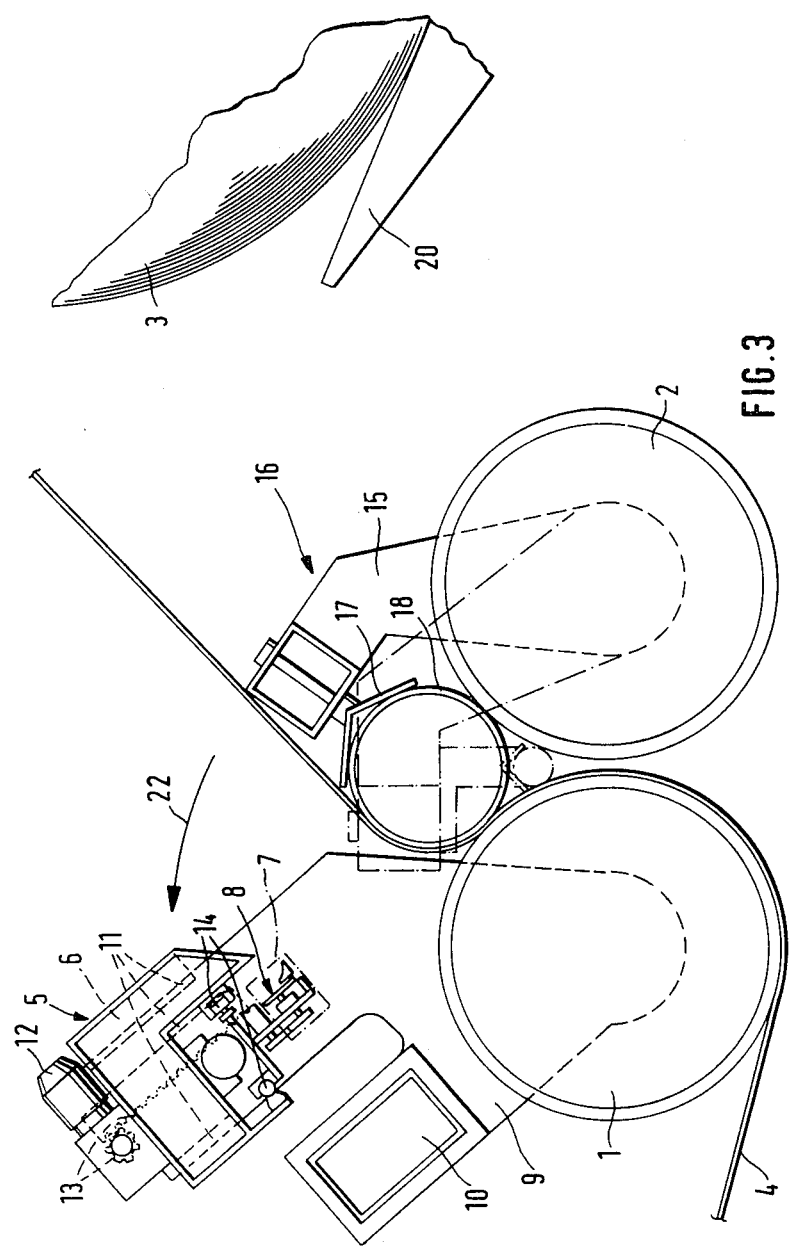

Core inserter 16 now pivots up on arm 15 as shown in FIG. 3 and drops a new core 18 into the carrier-roller bed, with web 4 resting against part of the circumference of the core, and returns to the ready position shown in FIG. 1, leaving the new core in the bed. Another core 18 can now be placed in the bed 17 of core inserter 16.

Figure 4:
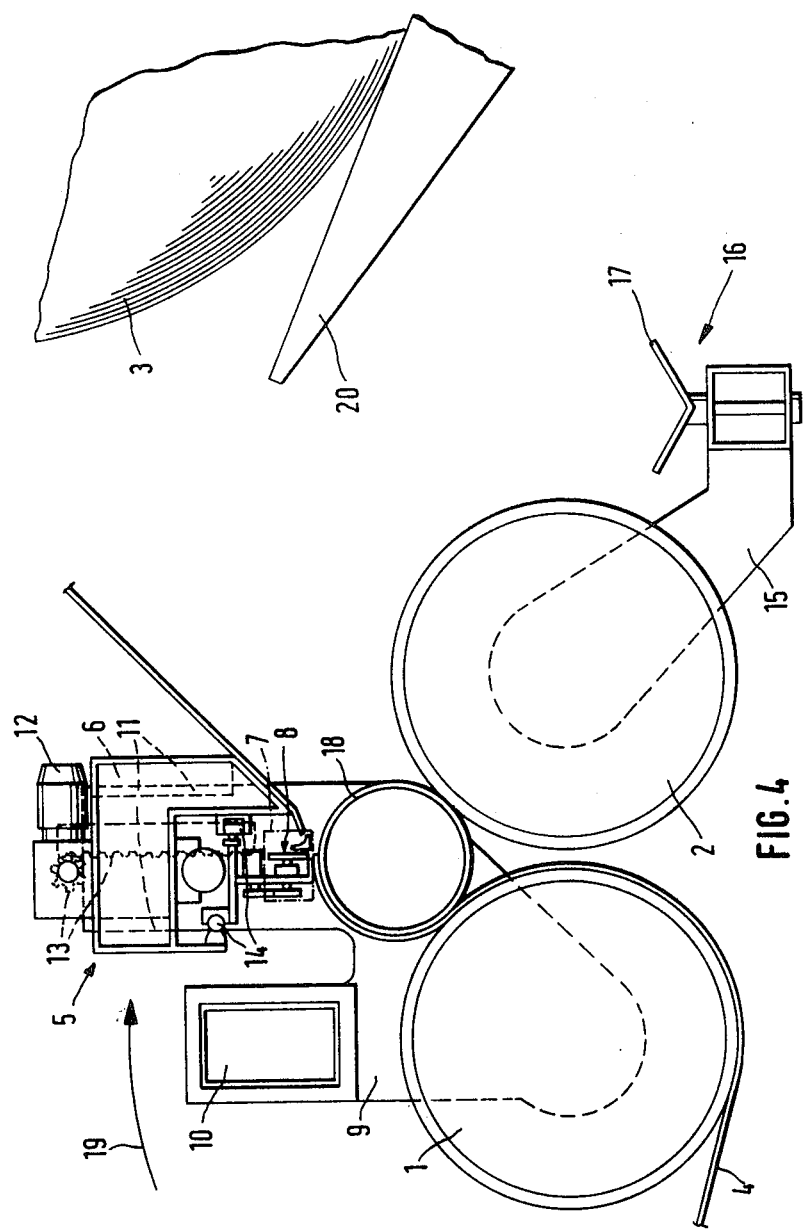

As illustrated in FIG. 4, assembly 5 can, while core inserter 16 is pivoting back into its ready position, pivot in the direction indicated by arrow 19 into an operating position above the carrier-roller bed. Even very delicate adjustments can be made in the position of movable assembly 5 in relation to an inserted core 18 to ensure that fastening and cutting device 7, 8 will precisely engage the core's upper vertical line. While assembly 5 is in the position shown in FIG. 5, a drive mechanism will slide fastening and cutting device 7, 8 along guides 14 on ejection beam 6 across web 4 and parallel to the axis of core 18 to allow cutting device 8 to make a smooth transverse cut in web 4 and fastening device 8 to fasten or glue the resulting new web end to the circumference of core 18. The drive mechanism for moving device 7,8 includes a driven shaft 22 operatively connected with guides 14 which cooperate with U-shaped rail 23 and 24.

Figure 5:
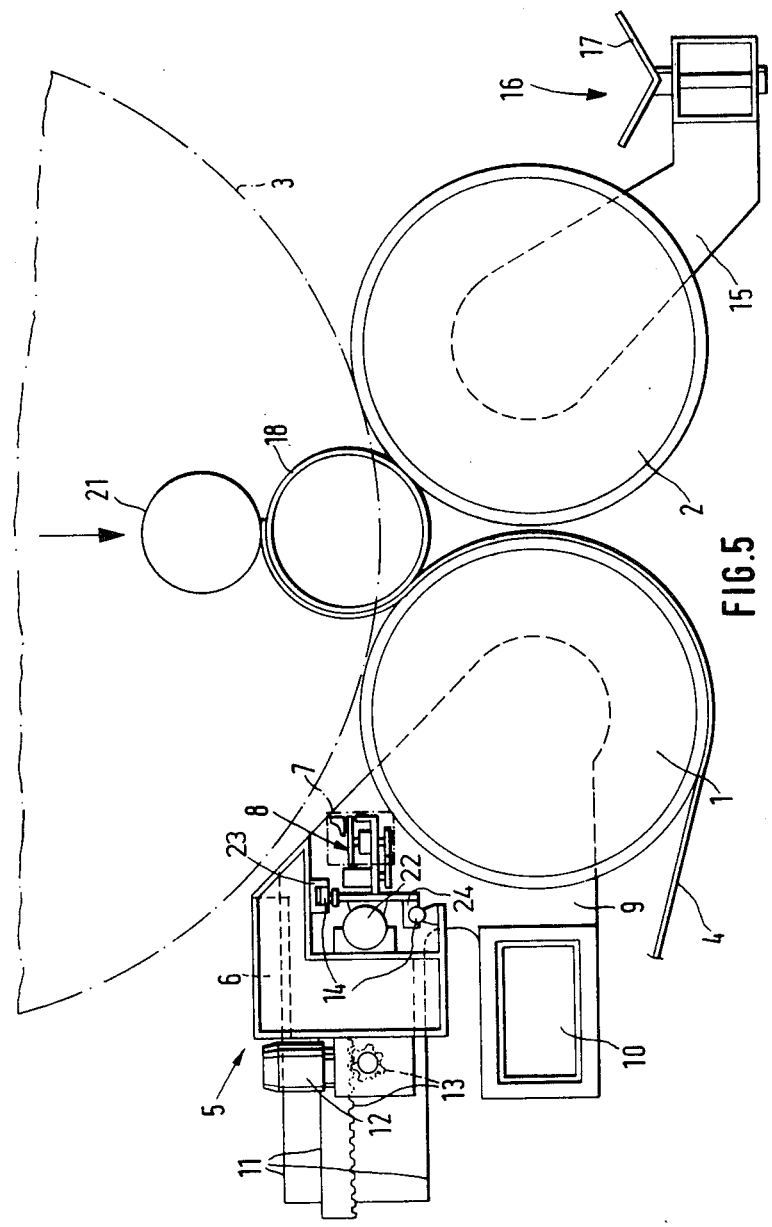

When web 4 has been cut and fastened, assembly 5 will pivot back out of the operating position illustrated in FIG. 4 and into the rest position in FIGS. 5 and 1, a pressure roller 21 will drop against core 18, and carrier rollers 1 and 2 will begin rotating to reinitiate the rotation and winding of core 18 with web 4.

It is understood that the specification and examples are illustrative but not limitative of the present invention and that other embodiments within the spirit and scope of the invention will suggest themselves to those skilled in the art.

I claim:

1. In a shaftless machine for winding a web on a roll the machine having a pair of carrier rollers of which at least one is driven, means for introducing a roll into the gap between said carrier rollers, an assembly comprising an ejection beam and cutting and fastening means, and means for pivoting the assembly about the axis of one of the carrier rollers so as to eject a wound roll and, after a new roll is introduced, to cut the web and to fasten it to the new roll, the improvement which comprises means for displacing the assembly transverse to the axes of the carrier rollers thereby to adjust the position of the ejecting, cutting and fastening means so as to accommodate rolls of different diameters, the assembly displacing means comprising at least one rail extending transverse to the axes of the carrier rollers, a rack and pinion connection between the assembly and pivoting levers, the rack extending parallel to the rail, and a motor for driving the assembly along the rail, the means for pivoting the assembly including a pair of pivoting levers.

2. A machine according to claim 1, wherein the carrier rollers are horizontal, the assembly pivoting means being capable of pivoting the assembly to vertical position in the midplane between the carrier rollers, the assembly displacing means operating on the assembly in such vertical position.

3. A machine according to claim 1, wherein the assembly includes at least one guide extending parallel to the carrier rollers axes, and means for moving the cutting and fastening means along said guide.

* * * * *